United States Patent [19]

Ivanov

[11] Patent Number: 5,980,644
[45] Date of Patent: Nov. 9, 1999

[54] METHOD OF CLEANING OF SPILLS OF OIL AND OIL PRODUCTS FROM SURFACES, AN ADSORBENT FOR CLEANING OF SURFACES, AND A METHOD FOR MAKING THE ADSORBENT

[76] Inventor: Vitaly Davydovich Ivanov, Kutuzovsky prospekt, 30/32, Apt. 235, Moscow, Russian Federation, 121165

[21] Appl. No.: 08/952,801
[22] PCT Filed: Sep. 25, 1996
[86] PCT No.: PCT/RU96/00148
  § 371 Date: Nov. 13, 1997
  § 102(e) Date: Nov. 13, 1997
[87] PCT Pub. No.: WO98/14404
  PCT Pub. Date: Apr. 9, 1998
[51] Int. Cl.⁶ ..................................................... B08B 7/04
[52] U.S. Cl. ..................................... 134/6; 134/7; 134/10
[58] Field of Search ...................... 134/6, 7, 10; 510/507, 510/462, 463, 487, 473, 439, 108, 110; 210/693, 502.1, 506

[56] References Cited

U.S. PATENT DOCUMENTS

| | | | |
|---|---|---|---|
| 3,464,920 | 9/1969 | Pirson et al. | 210/502.1 |
| 3,917,528 | 11/1975 | Orban et al. | 210/36 |
| 4,160,729 | 7/1979 | Wilcox | 210/40 |

FOREIGN PATENT DOCUMENTS

| | | |
|---|---|---|
| 973486 | 11/1982 | U.S.S.R. |
| 998645 | 2/1983 | U.S.S.R. |
| 1171585 | 8/1985 | U.S.S.R. |
| 1239094 | 6/1986 | U.S.S.R. |
| 1 350 734 | 4/1974 | United Kingdom |
| 1 417 960 | 12/1975 | United Kingdom |
| 1 422 999 | 1/1976 | United Kingdom |
| 1 427 809 | 3/1976 | United Kingdom |

*Primary Examiner*—Zeinab El-Arini
*Attorney, Agent, or Firm*—Kenyon & Kenyon

[57] ABSTRACT

The method of cleaning of spills of oil and oil products from different surfaces, including water surface and land, includes treatment by a composite adsorbent—aluminosilicate material exposed to water-repellent treatment. The absorbent (for example, an aluminosilicate material), which is a first waste product, is waste formed at burning dust coal in industrial furnaces with liquid slug removal. Water repellent is a second waste product of oil industry, wood chemistry, containing hydrocarbons, mass relationship of the first and second waste products is approximately between 1:0.001 to 1:0.25. The method for obtaining the absorbent includes a treatment of aluminosilicate material by water emulsion or water solution of water-repelling agent, at mass relationship of aluminosilicate material, water and water repellent 1:1–5:0.001–0.25 respectively, while stirring at temperature 80–85° C. (40–96° C.) for 30 minutes with further drying to constant wight at temperature between 105° C. to 120° C. After cleaning the surfaces, the used absorbent is regenerated by mixing the absorbent with 1–25% solution of ammonia at temperature 20–90° C. with further extraction of floated up aluminosilicate material for repeated use. The method provides 99% cleaning of water surfaces while using an accessible cheap adsorbent with an adsorption capacity of 1 to 10 grams of oil product per 1 gram of the adsorbent.

7 Claims, No Drawings

METHOD OF CLEANING OF SPILLS OF OIL AND OIL PRODUCTS FROM SURFACES, AN ADSORBENT FOR CLEANING OF SURFACES, AND A METHOD FOR MAKING THE ADSORBENT

This is a national stage application of International Application No. PCT/RU96/00148 filed Sep. 25, 1996.

THE FIELD OF THE INVENTION

The present invention relates to methods of adsorption cleaning of different surfaces, including water and land surfaces, polluted by spills of oil and oil products, and also to adsorbents for water cleaning, methods of producing the absorbent, which can be used to prevent ecological catastrophes.

BACKGROUND INFORMATION

Among the most important tasks in the field of cleaning of oil and oily products pollutions from different surfaces are creation of a highly efficient and cheap method of gathering oil, of an adsorbent, and also a method of producing an adsorbent, providing for localization of spills of oil and oil products by binding a spill into a lumpy mass. This lumpy mass can be easily gathered by mechanical means, kept on the surface, and is not significantly moved. In case of a land spill, the method must provide a localization of the spill, binding the spill into another lumpy mass that is easily removable by mechanical means, so that the oil is prevented from reaching the underground water. Such method must provide the degree of cleaning of water surfaces of up to 99%. The method must also allow a possibility of regeneration of oil or oil product that is gathered by the adsorbent. Implementation of this method should not require any special new technology. The method enables long preservation of the adsorbent, besides, a necessary quantity of the adsorbent can be prepared where it is applied.

Conventional methods of cleaning of oil and oil products from water surfaces, are based of on a use of adsorbents.

These conventional methods utilize adsorbents having porous construction materials (slag, expanded perlite, brick crunib, expanded clay aggregate, vermiculite) treated for water repellency by vapors of residual fuel oil, tar, bitumen, or technical oils.

Conventional methods which use the above-described adsorbents provide a high degree of cleaning of oil products from water surfaces.

When these conventional methods are used, the adsorbent is regenerated by transmitting a gaseous heat-transfer agent at 180–350° C. within 30 minutes.

A disadvantage of the conventional methods which use construction materials and wastes that are treated for water repellency is a use of substantively complicated technology, including both the process of water repellency treatment, and a complexity of applying the adsorbent to a spill of oil or oil products, especially if a spill is large enough.

This conventional method suggests using water-repellency treatment process in the immediate are of a catastrophe site.

Another conventional method uses an adsorbent such as a glass wool made of liquid glass and impregnated by silicon oil which contains SiOH group to increase affinity of silicon oil and glass.

However, this conventional method is very costly.

Another method uses as an adsorbent empty glass microspheres, with density 50 to 200 g/cm$^3$. The empty glass microspheres treated for water repellency by 2–20% solution of methylchlorinesilane, dimethyidichlorinesilane, mineral acids or a mix of these products for a total neutralization of alkaline groups of glass.

A method of gathering of oil spills and oil products based on this type of an adsorbent is very expensive and technically complicated because empty glass microspheres are produced using thermal blowing-out process under a pressure of liquid glass with predetermined relationship and predetermined density, and then further processing by expensive products (silanes).

Another conventional method of cleaning oil products from oil surfaces is a transmission of water with an addition of residual fuel oil through an adsorbent, an aerosilica, a gel exposed to water-repellency treatment by gasified marine residual oil, bitumen, or technical oils transmitting a gaseous heat-transfer agent at 180° C. for 80 minutes. The oil leaks out of the adsorbent for 40 minutes. Residual fuel oil capacity of the adsorbent decreases 4%.

The above described conventional method is disadvantageous in that a complicated equipment is utilized, and high power intensity of the adsorbent is required.

Another conventional adsorbent adsorbs oil pollutions, which represents a homogenous mixture of an aluminosilicate material (bloated vulcanized glass), cellulose fiber material (newsprint or craft-paper, flax combings, wood chip) and water repellent impregnator (bitumen, pitch, siloxane, or silane).

This composition can be also used to clean the oil from water surfaces or can be used as a strata through which water polluted with oil is filtrated. The efficiency of this composition is not high enough and not all the ingredients are always available.

Another conventional method of producing an adsorbent for cleaning oil from water surfaces uses sawdust which is infused by melt of hydrophobic filler, being an emersion oil which is a waste of thermal processing of wood is used as a filler.

The infusion is performed by mixing hot (50–80° C.) original ingredients taken in mass relation oil : sawdust 0.5–2:1. A waste that has not been previously used is utilized in this adsorbent, but its efficiency is not enough for gathering oil from water surfaces.

SUMMARY OF THE INVENTION

An object of the present invention is to develop a highly efficient and cheap method of cleaning surfaces polluted by oil or oil products using qualitative and quantitative selection of ingredients of the composite adsorbent, which not only provides a high degree of cleaning, but also achieves this result by using cheap products—wastes or sub-products.

This object is achieved using a method of cleaning of oil and oil products from surfaces using an adsorbent with an aluminosilicate material exposed to a water-repellency treatment. The aluminosilicate material is a waste product of a burning coal dust in industrial furnaces with liquid sludge removal, water-repelling agents are waste product or sub-products of oil, chemical industry, or wood chemistry, and liquid water-repellents at mass relation of waste 1:0.001–0.25.

The adsorbent is regenerated by 1–25% solution of ammonia by stirring components at 20–90° C. and hard: liquid relation=1:2–1.5 with further recovery of floated up aluminosilicate material for a repeated use.

DETAILED DESCRIPTION

The object of the present invention is achieved using a method of making composite adsorbent, in which water repellent (a waste product or sub-product of oil, chemical industry or wood chemistry) is applied in a form of water emulsion or water solution, with a stirring procedure being performed in a reactor, relative to an aluminosolicate material, water and a water repellent at a ratio of 1:1–5:0.001–0.25, at a temperature of 40–96° C., for 20–45 minutes, followed by a drying procedure to provide a constant weight at 105–120° C.

To increase adsorption capacity, it is preferable to use as a water repellent waste oil asphalt, rosin, tall pitch, tall oil, water repellent liquids, petroleum polymer acids, and the like.

Aluminosilicate ingredient of the composite adsorbent is a xenosphere—an element of fly ash wastes, which appear as a result of burning coal dust in industrial furnaces with liquid slug removal.

Xenospheres are a gray powder consisting of empty spherical particles. The shell of the xenosphere is composed of non-porous silicate glass. The material thickness of a shell is about 0.1 of a sphere's radius.

Xenospheres are chosen as a basis for a composite adsorbent because of their specific physical properties, their availability in large quantities, and low cost.

As a rule, xenospheres have the following qualitative-quantitative composition, % mass: $SiO_2$ 60–63; $Al_2O_3$ 25–29; $Fe_2O_3$ 2.2; $Na_2O+K_2O$ 2–3; $CaO$ 1.78; $MgO$ 0.3.

Diameter of xenosphere varies from 30 to 400 micron, apparent density between 0.550–0.750 g/cm$^3$, bulk density between 0.35–0.4 g/cm3. Destruction under hydrostatic pressure 10 Pa is effectuated between 0.8–12.0%. Temperature of caking is 1400–1600° C., and a melting interval melting is between 1250–1400° C.

Due to these characteristics, the xenosphere is an ideal base for a composite adsorbent. The physical properties of the xenospheres allow the oil saturated adsorbent to be maintained on the water and land surfaces. The size and strength of the xenospheres allow their dissemination to be performed using a standard rotor technology. Low density of the xenospheres allows for arranging efficient processes of regeneration of the used adsorbent.

Xenospheres are hydrophilic, thus in order to use them as adsorbents of oil and oil products, xenospheres should be subjected to a water-repellency treatment. Xenospheres are treated by low-concentration water emulsions or water solutions of a water-repelling agent. Due to such treatment on one hand, xenospheres acquire adsorbent property; in addition, the xenospheres maintain a fine powder composition that is convenient for applying the xenospheres on a spill.

Wastes like hydrocarbons can be used as a water repellent component. For example:

Petroleum paraffin, which is a mixture of saturated hydrocarbons with an open chain row from $C_{19}H_{40}$ to $C_{35}H_{72}$ with temperature of melting 49.0–72.0° C.;

Ceresin, which is a homogeneous wax product, consists of molecular substances that have a higher molecular composition than a petroleum paraffin. The Ceresin differs from paraffin by size of crystals and with a higher melting interval (57–85° C.).

Additional examples are also possible. For example, a petroleum remainder, which is a product of oil processing which represents a mixture of hard oil paraffins.

All these substances for water-repellent treatment of hydrophilic surfaces of xenospheres are used in a form of water emulsions. The most efficient water-repelling agent for this goal is, e.g., a petroleum paraffin.

In addition, different bitumen oil wastes can be used in a form of water emulsion.

The most efficient water repellent agent for this goal is heavy paving bitumen, however, a construction or roof bitumen can also be utilized Particular waste products of wood chemistry which also contain hydrocarbons can also be efficiently used as water repellent agents, such as, e.g.:

Gum rosin which is composed of resin acids with a common formula $C_{20}H_{30}O_2$ which represents a glass-type brittle mass with a melting point of 55° C.;

Tall pitch saponificate—a sub-product of sulphate cellulose production, with a softening temperature of 53° C.;

Tall oil—a product of sulfate cellulose production, representing a mixture of fat and resin acids; and Sulfate soap and sulfite soap—secondary wastes of sulfate and sulfite cellulose production.

Most of wood chemistry wastes (especially tall pitch and tall oil) are used for water repellency treatment of xenospheres in a form of water emulsion.

Water repellent agents described above enable various modifications of the adsorbent, to be produced which vary in costs and complexity of production technologies. These various modifications of the absorbent can be adapted for different regions of extraction and transportation of oil and oil products.

Irrespective of which water repellent agent is used, adsorbent can be created using the same process.

Usually xenospheres are gathered at ash dumps of power stations, and are washed. Xenospheres with 50% moisture content are dried in a centrifuge until the necessary percent of dumpiness is obtained. After drying, xenospheres can be sorted by particles size, if necessary.

Water repellency treatment can easily be utilized with this technological process as a substitute for the a washing after a natural drying. Water repellent agents interact with xenospheres in a form of water emulsions or water solutions. It makes the process of obtaining hydrophobic xenospheres simple, safe, and mobile.

Xenospheres are treated by water emulsions or water solutions of water repellents in a reactor with frame stirring, with a weight relation of the components being 1:0.001–0.25.

Using bitumen emulsion, tall pitch, water repelling liquids does not bring in any significant demands to temperatures of stirring and drying stages.

To prepare water emulsions of water repellents it is necessary to use emulsifying agents—surface-active substances.

As emulsifying agents can be e.g.:

High molecular acids, for example, olein acid which is, a transparent liquid with a density of 0.91 and having a general formula $C_{17}H_{33}COOH$;

Concentrate of sulfite-yeast ferment, which is gotten out of malt-residue at sulphite-alcohol production. It is a mixture of potassium and sodium (ammonium) salts of ligno-sulphonate acids. Concentrate is produced in a liquid form (contents of dry substances is 50% and in a hard form (contents of dry substances is 70%; and Cube remainders of synthetic fat acids, or synthetic fat acids (SFA).

Number of carbon atoms—$C_{17}$—$C_{20}$.

Acid number—195–230 mg/g.

When SFA are used as emulsifying agents, emulsions are prepares in a solution of caustic potash.

Preparing of bitumen emulsion is more complicated and demands special equipment (rotor-pulsate type apparatus) and double emulsifying, e.g.:

a) SFA+KOH b) sulfanol, and c) liquid sodium glass.

For a regeneration, a used adsorbent is collected, mixed with a water solution of ammonia, having a 1–25% mass concentration, temperature between 20° C. and 90° C., relation of hard:liquid ratio of 1:2–1.5, the lower layer of oil product and being separated, and xenospheres that have floated to the surface are reused This regeneration method enables a full collection and a separation of adsorbent oil products from te adsorbent.

PREFERRED EMBODIMENTS OF THE INVENTION

EXAMPLE 1

For obtaining a composition of adsorbent to 100 grams of dry microspheres, add 500 grams of water solution of tall pitch, containing 0.005 gram of tall pitch, are added; they are mixed for 20–25 minutes at temperature 40–45° C. Thus generated mixture in laboratory conditions is evaporated to 20–15%, and then dried further in a centrifuge. Xenospheres treated by a tall pitch solution with tall pitch can be also dried on trays at temperature not higher than 100° C. The generated adsorbent has the following relation of components:

xenospheres: tall pitch=1:0.005 mass.

Similarly adsorbents can be composed of xenospheres, with bitumen, which may include bitumen-latex composition, oil-polymer resins, water repelling liquids, and the like.

EXAMPLE 2

Gathering oil and oil products from land.

Adsorption of oil or oil product is determined using weighing process. Adsorption activity of the adsorbent is defined separately for oil spill on land and oil spill on water surface.

An oil spot weighing 4.19 gram is applied to a glass material weighing 29.58 gram. The total weight of the glass with the oil is 33.77 g. A sample 4.87 g of the adsorbent (xenospheres treated for water repellency by 5% emulsion of water repellent liquid) is applied to the oil until it is fully adsorbed, with a soption capacity being 1.07. The adsorbent is xenospheres exposed to water-repellent treatment by 5% emulsion of tall pitch. Weight of a glass is 29.59 g, weight of an oil spot—4.11 g, weight of the adsorbent—3.96 g. Sorption capacity—1.03.

The same experiment, this time with xenospheres exposed to water-repellency treatment by 3% water emulsion of paving bitumen. Weight of a glass—29.59 g, weight of the glass with oil—34.16 g, weight of the glass with oil adsorbed by a sample of the adsorbent—39.27 g. Adsorption capacity—0.86.

Thus, the adsorption capacity of the adsorbent collecting land spills, irrespective of a method of water-repellent treatment, being substantially equal to 1, or 1 g of the adsorbent adsorbing 1 g of oil or oil product.

EXAMPLE 3

Gathering oil or an oil product from water surface.

Petri dish is filled with water and weighted; then oil spot is applied on water surface in such a way, that it does not touch the petri dish walls. A sample of adsorbent is applied on the oil spot until it is fully adsorbed, and the dish is weight again. Oil product weight added to the adsorbent weight indicates the adsorbing capacity of the adsorbent.

The weight of a dry dish is 134.15 g, weight of the dish with water is 178.93 g. Weight of an oil spot is 0.4 g, weight of the dish with water and oil is 179.33 g. After processing of the oil spot by a sample of 0.04 g adsorbent of xenospheres treated for water-repellency by 5% water emulsion of hydrophobic liquid GKZh-94, weight of the dish becomes 179.37 g. Sorption capacity—10.0. Weight of the dish with water—173.44 g, and with water and an oil spot—173.90 g. After applying a sample of 0.22 g of the adsorbent, xenospheres are treated for water repellency by 5% solution of tall pitch, oil spot is adsorbed. Adsorption capacity of this adsorbent was 5 to 1, or 1 g of the adsorbent can adsorb 5 grams of oil.

After the experiment is repeated, and by stirring of oil and adsorbent, oil spot is adsorbed by 0.05 g of the adsorbent; which means that the adsorption capacity grew up to 9–10.

The same experiment as described above with xenospheres treated by 3% water of bitumen provided the following results.

Weight of the petri dish with water—186.76 g. Weight of the petri dish with water and 0.47 g. oil spot—187.23 g. Weight of a sample of the adsorbent—0.15 g. Adsorption capacity is 3.

EXAMPLE 4

Add 100 g of water emulsion of paving bitumen containing 25 g of bitumen to 100 g of dry xenospheres. The combination is then mixed and an adsorbent is extracted. Contents of the adsorbent is xenospheres: bitumen=1: 0.25. Thus obtained adsorbent is poured to a reservoir of water with 400 g of oil on the surface of the water, in the 20 minutes collect the adsorbent with the adsorbed oil. The degree of cleaning of water surface is 99.9%.

524.6 g of the product thus obtained by collecting oil from the water surface (contents of the product being xenospheres—100 g, bitumen—25 g, oil—399.6 g) are stirred with 1040 milliliter 25% solution of ammonia at 20° C. As a result, 420 g of oil product and 98.2 g of dry xenospheres are extracted for a repeated use.

Thus, the present invention enables to obtain a cheap accessible adsorbent with a capacity from 1 g to 10 g of oil product for 1 g of the adsorbent.

The present invention is simple in its implementation and cheap due to a use of industrial wastes and a simplicity of the regeneration process. The method is fireproof non-toxic, and does not enter into chemical reactions. Its usage does not pollute fresh and sea water. When used on water surfaces, with further regeneration, the cost of extracted oil covers cost of the adsorbent applied, and on land spills, it decreases it to ¼.

What is claimed is:

1. A method for cleaning oil spills and oil products from surfaces, comprising the steps of:

(a) forming a first waste product by burning a coal dust in an industrial furnace having a liquid slug removal (b) forming a second waste product using at least one of an oil processing and a wood-chemistry processing with hydrocarbons;

(c) cleaning a polluted surface using a composite adsorbent, the composite adsorbent including an aluminosilicate material being exposed to a water repellency treatment, the composite adsorbent using the first waste product as the aluminosilicate material and the second waste product as a water repelling agent, the aluminosilicate material and the water repelling agent having a ratio of between 1:0.001 and 1:0.25;

(d) mixing a water-ammonia solution with a used adsorbent of the composite adsorbent to separate the oil product from the composite adsorbent, wherein step (d) is performed with the following components:
   (I) the water-ammonia solution having a concentration of between 1% to 25%,
   (ii) a temperature being between 20° C. and 90° C., and
   (iii) a relationship of a hard form to a liquid form of the concentration being between 1:2 and 1:5;

(e) removing the oil products that were adsorbed; and (f) extracting a surfaced portion of the aluminosilicate material.

2. The method according to claim 1, wherein the second waste product of the oil processing includes at least one of a petroleum paraffin material, a ceresin material, construction bitumen, a paving bitumen and a roof petroleum bitumen.

3. The method according to claim 1, wherein the second waste product of the wood-chemistry processing includes at least one of a gum rosin material, a tall pitch material, a tall oil material, a sulfate soap material and a sulfite soap material.

4. An adsorbent for cleaning oil spills and oil products, comprising:

an aluminosilicate material exposed to a water-repellency treatment, the aluminosilicate material being formed by burning a dust coal material in an industrial furnaces having a liquid slug removal; and a water-repelling agent waste product generated using a wood-chemistry processing and using an oil processing containing saturated hydrocarbons, wherein the aluminosilicate material and the water repelling agent waste product have a ratio of between 1:0.001 and 1:0.25.

5. The adsorbent according to claim 4, wherein the aluminosilicate material includes a hollow xenosphere, the xenosphere having a shape of ball which has an approximate diameter of 1 mm, and having a weight which is less than three times a weight of water.

6. A method of producing an adsorbent for cleaning oil spills and oil products from surfaces using an aluminosilicate material, comprising the steps of:

(a) forming a first waste product by burning a coal dust in an industrial furnace having a liquid slug removal;

(b) forming a second waste product using at least one of an oil processing and a wood-chemistry processing with hydrocarbons;

(c) treating the first waste product using at least one of a water emulsion process and a water solution of the second waste product which is a water-repelling agent, wherein the aluminosilicate material and water have a ratio of between 1:1 and 1:5, wherein the aluminosilicate material and the water-repelling agent have a ratio between 1:0.001 and 1:0.25, and wherein a temperature is between 40° C. and 96° C.; and (d) drying the adsorbent to provide a constant weight at a temperature which is between 100° C. and 120° C.

7. The method according to claim 6, wherein the aluminosilicate material includes a hollow xenosphere, the xenosphere having a shape of ball which has an approximate diameter of 1 mm, and having a weight which is less than three times a weight of water.

* * * * *